United States Patent

Kato

[11] 4,175,532
[45] Nov. 27, 1979

[54] COMBUSTION CHAMBER OF AN INTERNAL COMBUSTION ENGINE

[75] Inventor: Takashi Kato, Susono, Japan

[73] Assignee: Toyota Jidosha Kogyo Kabushiki Kaisha, Toyota, Japan

[21] Appl. No.: 889,874

[22] Filed: Mar. 23, 1978

[51] Int. Cl.² ............................................. F02B 19/16
[52] U.S. Cl. .............................. 123/191 S; 123/32 C; 123/32 L
[58] Field of Search ............. 123/32 C, 32 SP, 191 S, 123/191 R, 191 SP, 193 H, 32 K, 32 L

[56] References Cited

U.S. PATENT DOCUMENTS

| | | | |
|---|---|---|---|
| 4,004,563 | 1/1977 | Nakamura et al. | 123/32 K |
| 4,038,959 | 8/1977 | Takizawa et al. | 123/191 SP |
| 4,076,000 | 2/1978 | Goto et al. | 123/191 S |
| 4,098,246 | 7/1978 | Noguchi et al. | 123/191 S |
| 4,128,081 | 12/1978 | Noguchi et al. | 123/191 S |

Primary Examiner—Charles J. Myhre
Assistant Examiner—Craig R. Feinberg
Attorney, Agent, or Firm—Stevens, Davis, Miller & Mosher

[57] ABSTRACT

Disclosed is an internal combustion engine comprising a main combustion chamber and an auxiliary combustion chamber which are interconnected to each other via a connecting passage. An additional passage is provided for communicating the connecting passage with the main combustion chamber. The additional passage opens into the connecting passage towards the electrode of the spark plug, which is located in the connecting passage.

8 Claims, 3 Drawing Figures

COMBUSTION CHAMBER OF AN INTERNAL COMBUSTION ENGINE

DESCRIPTION OF THE INVENTION

The present invention relates to a combustion chamber of an internal combustion engine equipped with an auxiliary combustion chamber.

There has been known an engine in which a combustion chamber comprises a main combustion chamber and an auxiliary combustion chamber which are interconnected to each other via a connecting passage, the spark gap of a spark plug being located in the connecting passage. In this engine, at the time of the intake stroke, a lean air-fuel mixture or a mixture containing recirculated exhaust gas therein is introduced into the main combustion chamber. Then, at the time of the compression stroke, the combustible mixture in the main combustion chamber is forced into the auxiliary combustion chamber via the connecting passage. After this, the combustible mixture in the auxiliary combustion chamber is ignited by the spark plug and, then, the combustible mixture in the main combustion chamber is ignited by the high velocity burning jet injected from the connecting passage.

In an engine of this type, since the inside of the auxiliary combustion chamber is not positively scavenged, a large amount of the residual exhaust gas remains in the auxiliary combustion chamber under an operating condition such as idling wherein the amount of the residual exhaust gas remaining in the main combustion chamber is large. Consequently, in this engine, if the spark gap of the spark plug is located in the auxiliary combustion chamber, a misfire occurs, and it is impossible to operate an engine particularly when a lean air-fuel mixture or a mixture containing the recirculated exhaust gas therein is used. Therefore, in an engine of the above-mentioned type, the spark gap of the spark plug is located in the connecting passage so as to ignite the combustible mixture flowing in the connecting passage from the main combustion chamber into the auxiliary combustion chamber at the time of the compression stroke by means of the spark plug for improving the ignition.

It is true that the ignition is improved at the time of idling by positioning the spark gap of the spark plug in the connecting passage as mentioned above. However, when the engine is rotating at a high speed and particularly when the ignition timing is advanced, the flow velocity of the combustible mixture flowing in the connecting passage at the time of ignition is fast and, thus, the flow velocity of the combustible mixture flowing around the spark gap of the spark plug is also fast. As a result of this, the discharge arc is extinguished by the stream of the combustible mixture and, thus, the growth of the flame core is prevented. This results in a problem that a misfire occurs.

An object of the invention is to provide an engine capable of eliminating the above-mentioned problem.

According to the present invention, there is provided an internal combustion engine comprising: a main combustion chamber; a cylinder head positioned over one end of said main combustion chamber and having therein a cavity defining an auxiliary combustion chamber; an intake valve movably mounted in said cylinder head for leading a combustible mixture into said main combustion chamber; an exhaust valve movably mounted in said cylinder head for discharging an exhaust gas into the atmosphere; a connecting passage formed in said cylinder head and communicating said main combustion chamber with said auxiliary combustion chamber for leading the combustible mixture in said main combustion chamber into said auxiliary combustion chamber at the time of the compression stroke; and a spark plug having a spark gap located in said connecting passage, wherein the improvement comprises an additional passage formed in said cylinder head and communicating said connecting passage with said combustion chamber.

The present invention may be more fully understood from the following description of preferred embodiments of the invention, together with the accompanying drawings.

BRIEF DESCRIPTION OF THE INVENTION

DESCRIPTION OF PREFERRED EMBODIMENTS

Figure 1:
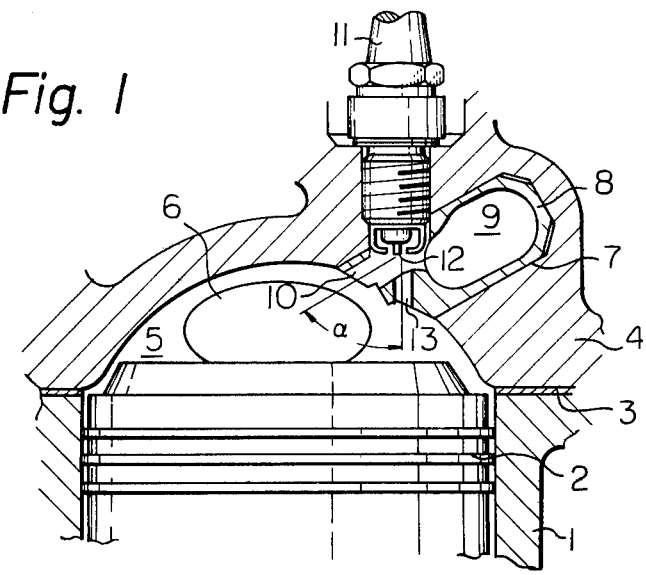
FIG. 1 is a cross-sectional side view of an embodiment of an engine according to the present invention.

Referring to FIG. 1, 1 designates a cylinder block, 2 a piston reciprocally movable in the cylinder block 1, 4 a cylinder head fixed onto the cylinder block 1 via a gasket 3 and 5 a main combustion chamber formed between the cylinder head 4 and the piston 2; 6 designates an intake valve, 8 an auxiliary chamber component press-fitted into a recess 7 formed in the cylinder head 4, 9 an auxiliary combustion chamber formed in the auxiliary chamber component 8, 10 a connecting passage communicating the main combustion chamber 5 with the auxiliary combustion chamber 9 and formed in the auxiliary chamber component 8, and 11 a spark plug. The electrode 12 of the spark plug 11 is located in the connecting passage 10. In addition, an exhaust valve (not shown) is movably mounted on the cylinder head 4. According to the present invention, an additional passage 13 communicating the connecting passage 10 with the main combustion chamber 5 is formed in the auxiliary chamber component 13. This additional passage 13 opens into the main combustion chamber 5 on one hand and into the connecting passage 10 towards the electrode 12 of the spark plug 11 on the other hand. In operation, at the time of the intake stroke, a lean air-fuel mixture or a mixture containing the recirculated exhaust gas therein is introduced into the main combustion chamber 5. Then, at the time of the compression stroke, the combustible mixture in the main combustion chamber 5 is forced into the auxiliary combustion chamber 9 via the passage 10 and the additional passage 13. At this time, the combustible mixture flowing out from the additional passage 13 comes into violent contact with the combustible mixture flowing in the connecting passage 10.

When the engine is operating under an idling condition, that is, when the engine is rotating at a low speed, the combustible mixture flows into the auxiliary combustion chamber 9 from the main combustion chamber 5 at a low speed at the time of the compression stroke. In this case, since the combustible mixture flowing in the connecting passage 10 is pushed towards the electrode 12 of the spark plug 11 by the combustible mixture flowing out from the additional passage 13, the residual exhaust gas remaining around the electrode 12 of the spark plug 11 is fully scavenged by the combustible mixture flowing in the connecting passage 10. As a result of this, the scavenging operation is improved as compared with that in a conventional engine and, thus, an ease of ignition can be obtained at the time of idling.

When the engine is rotating at a high speed, that is, when the combustible mixture flows into the auxiliary combustion chamber 9 from the main combustion chamber 5 at a high speed, since the additional passage 13 is so arranged that the stream of the combustible mixture flowing out from the additional passage 13 suppresses the forward movement of the combustible mixture flowing in the connecting passage 10 from the main combustion chamber 5 into the auxiliary combustion chamber 9, the stream of the combustible mixture flowing around the electrode 12 of the spark plug 11 is decelerated. As a result of this, the discharge arc remains on the electrode 12 of the spark plug 11 without being extinguished. In addition, since the combustible mixture flowing out from the additional passage 13 comes into violent contact with the combustible mixture flowing in the connecting passage 10 at a position around the electrode 12 of the spark plug 11, a microturbulence is created around the electrode 12 of the spark plug 11 and, as a result, the flame core created by the discharge arc of the spark plug 11 rapidly grows without being affected by the residual exhaust gas remaining in the auxiliary combustion chamber 9. Therefore, even if the engine is rotating at a high speed, a stable combustion can be obtained without occurence of a misfire.

In order to push the combustible mixture in the connecting passage 10 towards the electrode 12 of the spark plug 11 and decelerate the stream of the combustible mixture flowing in the connecting passage 10 as mentioned above, it is preferable that an angle α between the axis of the connecting passage 10 and the axis of the additional passage 13 be more than 45 degrees.

The combustible mixture ignited by the spark plug 11 is rapidly burned in the auxiliary combustion chamber 9 and, then, the burning jet is injected into the main combustion chamber 5 from the auxiliary combustion chamber 9. At this time, since the angle α between the axis of the connecting passage 10 and the axis of the additional passage 13 is set at more than 45 degrees as mentioned above, large part of the burning jet passes through the connecting passage 10 and is injected into the main combustion chamber 5. Consequently, the additional passage 13 does not have a great influence on the strength of the burning jet, and the strength of the burning jet is determined by the cross-sectional area of the connecting passage 10. Therefore, even if the additional passage 13 is provided in addition to the connecting passage 10, there is no danger that the strength of the burning jet will be weakened.

Figure 2:
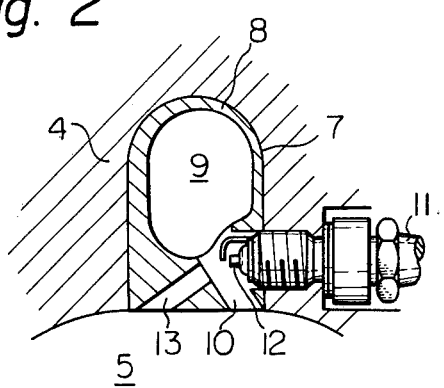
FIG. 2 is a cross-sectional side view of a cylinder head of another embodiment according to the present invention.

FIG. 2 illustrates another embodiment according to the present invention. In this embodiment, the opening of the connecting passage 10 is directed to the inner wall of the auxiliary combustion chamber 9, which is located at a position opposite to the spark plug 11 with respect to the axis of the auxiliary combustion chamber 9. In addition, the additional passage 13 is so arranged that it opens into the connecting passage 10 towards the electrode 12 of the spark plug 11 and, in addition, an angle between the axis of the connecting passge 10 and the axis of the additional passage 13 is a right angle.

Figure 3:
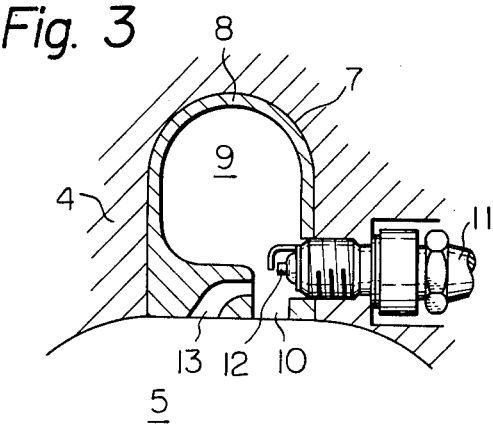
FIG. 3 is a cross-sectional side view of a cylinder head of a further embodiment according to the present invention.

FIG. 3 illustrates a further embodiment according to the present invention. In this embodiment, the additional passage 13 opens into the connecting passage 10 at a position near the main combustion chamber 5 relative to the electrode 12 of the spark plug 11. When the combustible mixture flows in the connecting passage 10 at a low speed, as in the case wherein the engine is operating under an idling condition, the combustible mixture flowing in the connecting passage 10 is pushed towards the electrode 12 of the spark plug 11 by the combustible mixture flowing out from the additional passage 13. As a result of this, the space around the electrode 12 of the spark plug 11 is fully scavenged and, thus, ignition is improved. On the other hand, when the combustible mixture flows in the connecting pasage 10 at a high speed, the combustible mixture flowing out from the additional passage 13 comes into violent contact with the combustible mixture flowing in the connecting passage 10 at a position near the main combustion chamber 5 relative to the electrode 12 of the spark plug 11. As a result of this, the stream of the combustible mixture flowing in the connecting passage 10 is decelerated and, thus, the discharge arc created on the electrode 12 of the spark plug 11 is prevented from being extinguished.

In the embodiments illustrated in FIGS. 2 and 3, an angle between the axis of the connecting passage 10 and the axis of the opening of the additional passage 13 is set at a right angle. Consequently, the additional passage 13 has no influence on the strength of the burning jet injected from the auxiliary combustion chamber 9 into the main combustion chamber 5.

As is hereinbefore described, the provision of the additional passage 13 causes an improvement in the ignition. Consequently, even if the exhaust gas is recirculated into the intake system of an engine for reducing the amount of harmful Nox component in the exhaust gas, a good ignition can be obtained. Of course, in this case, an engine needs to be provided with an exhaust gas recirculation system for recirculating the exhaust gas from the exhaust system to the intake system of an engine. According to the present invention, a good ignition can be obtained while maintaing a strong burning jet in any operating condition of an engine. In addition, the combustion chamber of an engine according to the present invention can be easily manufactured because the additional passage can be easily formed by merely forming a bore in a conventional auxiliary chamber component.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising: a main combustion chamber; a cylinder head positioned over one end of said main combustion chamber and having therein a cavity defining an auxiliary combustion chamber; an intake valve movably mounted in said cylinder head for leading a combustible mixture into said main combustion chamber; an exhaust valve movably mounted in said cylinder head for discharging exhaust gas into the atmosphere; a substantially straight connecting passage in said cylinder head and directly fluidly communicating said main combustion chamber with said auxiliary combustion chamber for leading the combustible mixture in said main combustion chamber into said auxiliary combustion chamber at the time of the compression stroke, one end of said connecting passing opening directly into said main combustion chamber and the other end of said connecting passage opening directly into said auxiliary combustion chamber; a spark plug having a spark gap in said connecting passage; an additional passage in said cylinder head and directly fluidly communicating said connecting passage with said main combustion chamber, one end of said additional passage opening directly into said connecting passage and the other end of said additional passage opening directly into said main combustion chamber, and said one end of said additional passage pointing toward said spark gap.

2. An internal combustion engine as claimed in claim 1, wherein said additional passage is substantially straight.

3. An internal combustion engine as claimed in claim 1, wherein the angle between the axis of the connecting passage and the axis of said one end of said additional passage is greater than 45 degrees.

4. An internal combustion engine as claimed in claim 3, wherein the angle is substantially 90 degrees.

5. An internal combustion engine comprising: a main combustion chamber; a cylinder head positioned over one end of said main combustion chamber and having therein a cavity defining an auxiliary combustion chamber; an intake valve movably mounted in said cylinder head for leading a combustible mixture into said main combustion chamber; an exhaust valve movably mounted in said cylinder head for discharging exhaust gas into the atmosphere; a substantially straight connecting passage in said cylinder head and directly fluidly communicating said main combustion chamber with said auxiliary combustion chamber for leading the combustible mixture in said main combustion chamber into said auxiliary combustion chamber at the time of the compression stroke, one end of said connecting passage opening directly into said main combustion chamber and the other end of said connecting passage opening directly into said auxiliary combustion chamber, a spark plug having a spark gap in said connecting passage; an additional passage in said cylinder head and directly fluidly communicating said connecting passage with said main combustion chamber, one end of said additional opening directly into said connecting passage in a region thereof closer to the main combustion chamber than the spark gap and the other end of said additional passage opening directly into said main combustion chamber.

6. An internal combustion engine as claimed in claim 5, wherein said additional passage is arcuate along its longitudinal axis.

7. An internal combustion engine as claimed in claim 5, wherein the angle between the axis of the connecting passage and the axis of said one end of said additional passage is greater than 45 degrees.

8. An internal combustion engine as claimed in claim 7, wherein the angle is substantially 90 degrees.

* * * * *